US007861253B1

(12) United States Patent
Lettington et al.

(10) Patent No.: US 7,861,253 B1
(45) Date of Patent: Dec. 28, 2010

(54) SYSTEMS AND METHODS FOR ACCESSING A BUSINESS INTELLIGENCE SYSTEM THROUGH A BUSINESS PRODUCTIVITY CLIENT

(75) Inventors: Drew Thomas Lettington, San Diego, CA (US); Jeffrey Bedell, Arlington, VA (US); Gail Marie Hurn, Poway, CA (US); Anna Victoria Duyongco, San Diego, CA (US)

(73) Assignee: Microstrategy, Inc., McLean, VA (US)

( * ) Notice: Subject to any disclaimer, the term of this patent is extended or adjusted under 35 U.S.C. 154(b) by 1404 days.

(21) Appl. No.: 10/991,089

(22) Filed: Nov. 18, 2004

Related U.S. Application Data

(63) Continuation of application No. 10/986,111, filed on Nov. 12, 2004, now abandoned.

(51) Int. Cl.
    *G06F 13/00* (2006.01)
(52) U.S. Cl. .................... 719/328; 719/311; 715/700
(58) Field of Classification Search ............ 719/311, 719/328; 715/700
    See application file for complete search history.

(56) References Cited

U.S. PATENT DOCUMENTS

| 4,514,826 | A | 4/1985 | Iwata |
|---|---|---|---|
| 4,688,195 | A | 8/1987 | Thompson |
| 4,755,929 | A | 7/1988 | Outous |
| 4,829,423 | A | 5/1989 | Tennant |
| 4,876,643 | A | 10/1989 | McNeil |
| 5,197,005 | A | 3/1993 | Shwartz |
| 5,247,665 | A | 9/1993 | Matsuda |
| 5,276,870 | A | 1/1994 | Shan |
| 5,349,684 | A | 9/1994 | Edem |
| 5,418,943 | A | 5/1995 | Borgida |
| 5,421,008 | A | 5/1995 | Banning |
| 5,537,603 | A | 7/1996 | Baum |
| 5,555,403 | A | 9/1996 | Cambot |
| 5,584,024 | A | 12/1996 | Shwartz |
| 5,659,734 | A | 8/1997 | Tsuruta |
| 5,664,182 | A | 9/1997 | Nirenberg |
| 5,692,181 | A | 11/1997 | Anand |
| 5,864,856 | A | 1/1999 | Young |
| 5,914,878 | A | 6/1999 | Yamamoto |
| 5,970,493 | A | 10/1999 | Shoup |
| 6,006,251 | A | 12/1999 | Yoyouchi |

(Continued)

OTHER PUBLICATIONS

Kurz, A. et al., Data warehousing within intranet: prototype of a web-based executive information system, IEEE Database and Expert Systems Applications, pp. 627-632.

(Continued)

*Primary Examiner*—Andy Ho
(74) *Attorney, Agent, or Firm*—Hunton & Williams, LLP

(57) ABSTRACT

A multi-level interface client for business productivity clients such as spreadsheet, word processor, presentation, database and email clients. The multi-level interface client provides backend functionality permitting a business intelligence server, such as an OLAP system to be accessed directly from the productivity client. Reports displayed in the documents native to the productivity client can be updated directly in the client by executing operations on the business intelligence server through the interface client. Layout and formatting information specific to the client is stored as persistence information by interface client in the productivity client document file and is used to refresh the displayed report in the file without a loss of formatting or layout properties.

41 Claims, 7 Drawing Sheets

U.S. PATENT DOCUMENTS

| | | | |
|---|---|---|---|
| 6,012,066 A | | 1/2000 | Discount |
| 6,073,134 A | | 6/2000 | Shoup |
| 6,078,924 A | | 6/2000 | Ainsbury |
| 6,108,657 A | | 8/2000 | Shoup |
| 6,154,766 A | | 11/2000 | Yost |
| 6,247,008 B1 | | 6/2001 | Cambot |
| 6,279,033 B1 | | 8/2001 | Selvarajan et al. |
| 6,697,808 B1 | | 2/2004 | Hurwood et al. |
| 6,836,796 B2 | * | 12/2004 | Schwartz et al. ............ 709/223 |
| 7,065,536 B2 | * | 6/2006 | Bachman et al. ............ 707/200 |
| 7,216,335 B2 | * | 5/2007 | Meredith et al. ............ 717/114 |
| 7,219,157 B2 | * | 5/2007 | Blott et al. .................. 709/238 |
| 7,237,257 B1 | * | 6/2007 | Hirsh .......................... 726/10 |
| 7,243,106 B2 | * | 7/2007 | Vierich et al. ...................... 1/1 |
| 7,305,477 B2 | * | 12/2007 | Gbadegesin ................ 709/227 |
| 2003/0125929 A1 | * | 7/2003 | Bergstraesser et al. ......... 704/9 |
| 2005/0120051 A1 | * | 6/2005 | Danner et al. ............ 707/104.1 |
| 2005/0240653 A1 | * | 10/2005 | Anglero ...................... 709/203 |
| 2006/0085446 A1 | * | 4/2006 | Thanu et al. ................ 707/100 |
| 2006/0089939 A1 | * | 4/2006 | Broda et al. ................. 707/100 |
| 2007/0250600 A1 | * | 10/2007 | Freese et al. ................. 709/219 |
| 2008/0215370 A1 | * | 9/2008 | Dent et al. ...................... 705/3 |

OTHER PUBLICATIONS

Robert C. Stern, Bruce M. Anderson and Craig W. Thompson, A Menu-Based Natural Language Interface to a Large Database, Texas Instruments Incorporated, P. O. Box 660246, MS 238, Dallas, Texas 75266, NAECON: National Aerospace & Electronics Conference, Dayton, Ohio, May 20-24, 1985.

Harry R. Tennant, Kenneth M. Ross, Richard M. Saenz, Craig W. Thompson, and James R. Miller, Computer Science Laboratory, Central Research Laboratories, Texas Instruments Incorporated, Dallas, Texas, 21st Annual Meeting of the Association for Computational Linguistics, MIT, Jun. 1983, pp. 151-158.

Harry R. Tennant, Member, IEEE, Roger R. Bate, Member, IEEE, Stephen M. Corey, Lawrence Davis, Paul Kline, LaMott G. Oren, Malipatola Rajinikanth, Richard Saenz, Daniel Stenger, Member, IEEE, and Craig W. Thompson, Software Innovations for the Texas Instruments Explorer Computer, Proceedings of the IEEE, vol. 73, No. 12, Dec. 1985.

Craig W. Thompson, Kenneth M. Ross, Harry R. Tennant and Richard M. Saenz, Building Usable Menu-Based Natural Language Interfaces to Databases, Proceedings of the Ninth International Conference on Very Large Data Bases, Florence, Italy, Oct. 31-Nov. 2, 1983, pp. 43-55.

Craig W. Thompson, John Kolts, and Kenneth W. Ross, A Toolkit for Building "Menu-Based Natural Language" Interfaces, Texas Instruments Incorporated, P. O. Box 226015, MS 238, Dallas, Texas 75265, 1985.

Craig Warren Thompson, M.A., B.A., Using Menu-Based Natural Language Understanding to Avoid Problems Associated with Traditional Natural Language Interfaces to Databases, Dissertation Presented to the Faculty of The Graduate School of the University of Texas at Austin, May 1984.

MicroStrategy Introduces DSS Server 5.0, Dynamic Data Marts Enable Creation of Application Subsets, Reduce Warehouse Development Time, and Facilitate Integration with Third Party Tools.

MicroStratetgy Enhances DSS Server to Support E-Business Initiatives with Improved Performans, Reliability, and Scalability, 5.6 Release Increases Throughput, Streamlines Processing and Offers Support for Microsoft Cluster Server.

Microstrategy Announces Enhanced Versions of DSS Web and DSS Server, New 5.5 Versions offer Advanced Reporting Functionality on Top of the Industry's Most Powerful Analytical Engine for Enterprise-Wide DSS Solutions.

Business Objects User's Guide Version 5.1.
Getting Started with Business Objects Version 5.1.
Business Objects Deployment Guide.
Broadcast Agent 5.1.
Business Objects 5.1.
Web Intelligence 2.6.
Business Objects Designer's Guide Version 5.1.
Business Objects Error Message Guide Version 5.1.
Business Objects Generic ODBC Access Guide Version 5.1.
Business Objects Info View User's Guide.
Business Objects Installation and Upgrade Guide.
Business Objects MS Access Database Guide Version 5.1.
Business Objects MS SQL Server Database Guide Version 5.1.
Business Objections Supervisor's Guide Version 5.1.
Quick Start MicroStrategy Agent Version 6.0.
User Guide MicroStrategy Agent Version 6.0.
User Guide MicroStrategy Architect Version 6.0.
User Guide MicroStrategy Objects Version 6.0.
Excel Add-In MicroStrategy Objects Version 6.0.
User Guide MicroStrategy Intelligence Server Version 6.0.
User Guide MicroStrategy Administrator Version 6.0.
Administrator Guide MicroStrategy Administrator Version 6.5.
Administrator Guide MicroStratetgy Broadcast Server Version 6.5.

* cited by examiner

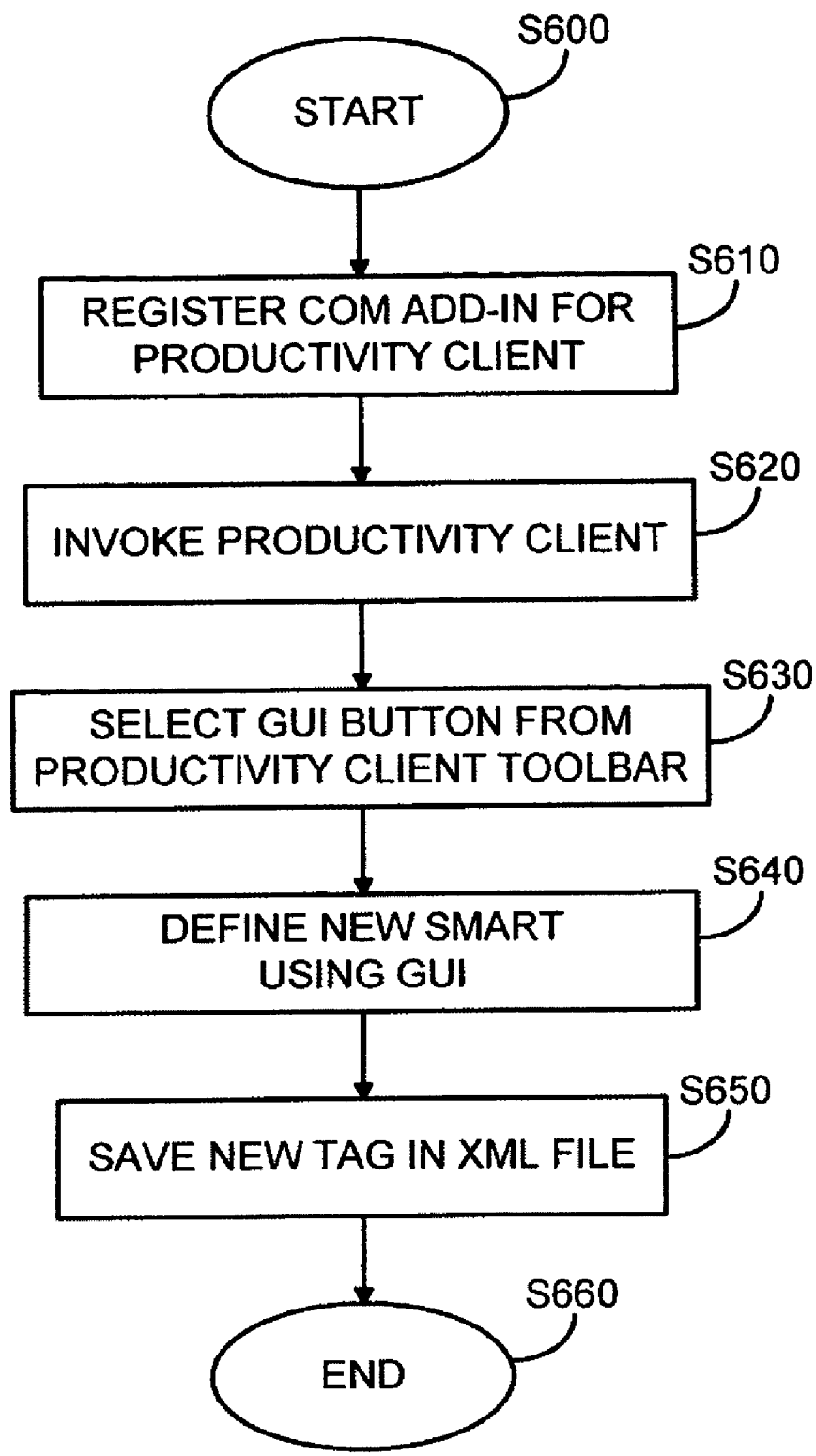

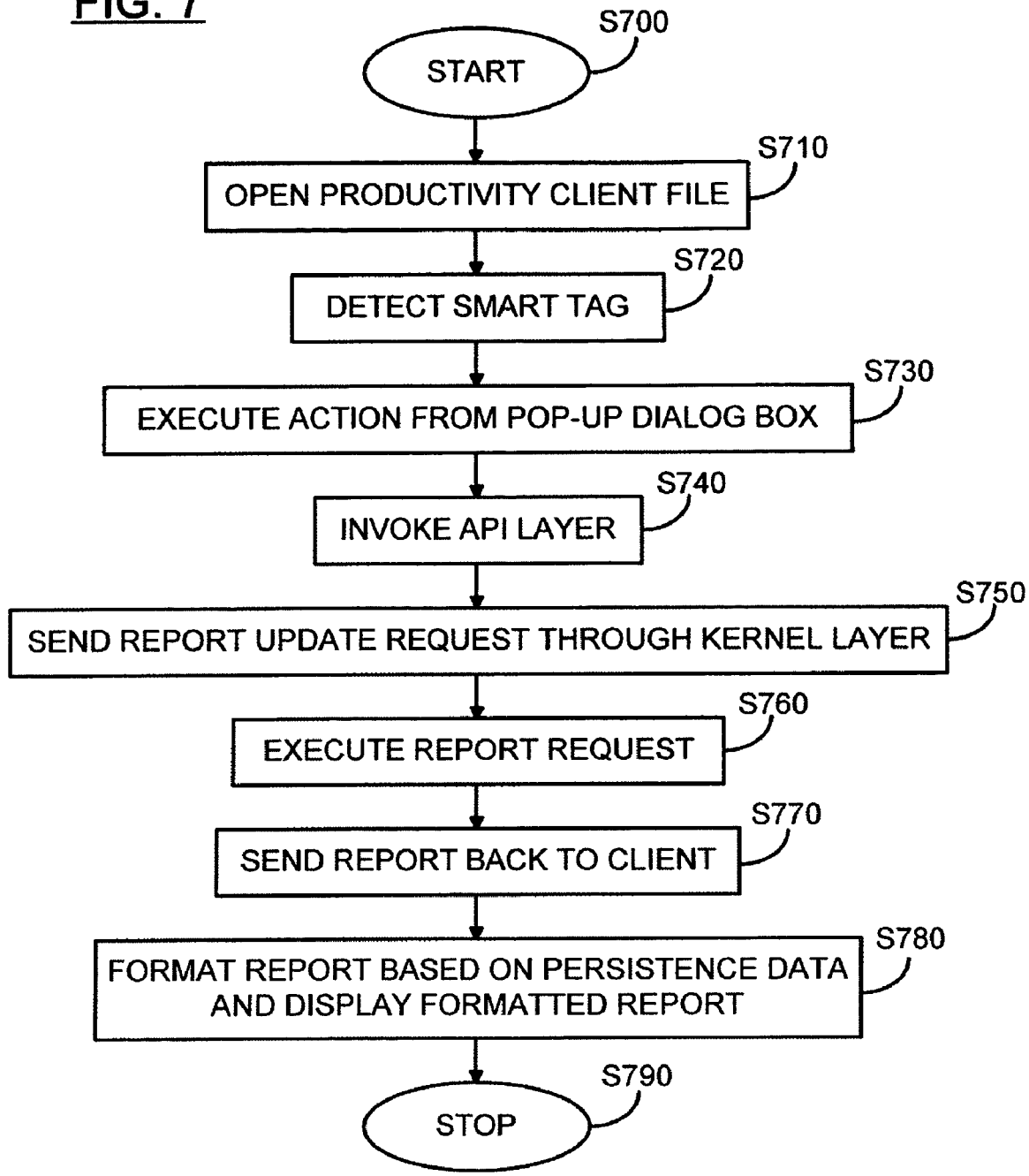

SYSTEMS AND METHODS FOR ACCESSING A BUSINESS INTELLIGENCE SYSTEM THROUGH A BUSINESS PRODUCTIVITY CLIENT

CROSS-REFERENCE TO RELATED APPLICATION

This patent application is a Continuation (CON) of U.S. application Ser. No. 10/986,111, filed Nov. 12, 2004 now abandoned, entitled "Systems and Methods for Accessing a Business Intelligence System Through A Business Productivity Client."

FIELD OF THE INVENTION

The present invention relates to the field of data processing and analytics and, more particularly, to systems and methods of natively accessing a data processing and analytics system through a business productivity client.

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge is to ensure all relevant information is available in a timely manner.

One known approach to addressing these and other challenges is known as data warehousing. Data warehouses, relational databases, and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems have been developed to efficiently retrieve selected information from data warehouses. One type of decision support system is known as an on-line analytical processing system ("OLAP"). In general, OLAP systems analyze the data from a number of different perspectives and support complex analyses against large input data sets.

There are at least three different types of OLAP architectures—ROLAP, MOLAP, and HOLAP. ROLAP ("Relational On-Line Analytical Processing") systems are systems that use a dynamic server connected to a relational database system. Multidimensional OLAP ("MOLAP") utilizes a proprietary multidimensional database ("MDDB") to provide OLAP analyses. The main premise of this architecture is that data must be stored multidimensionally to be viewed multidimensionally. A HOLAP ("Hybrid On-Line Analytical Processing") system is a hybrid of these two.

Typically, business users rely on the above-noted OLAP systems to analyze large volumes of their business information in order to ascertain useful trends and productivity information. The OLAP systems are used to query databases containing the business information and to generate customizable reports which summarize this information.

While OLAP systems are a powerful tool for querying a business entities business information databases, the reports generated by these systems are not the preferred method of conveying information to other members of a business organization, in particular business managers and others who rely on this information to make business decisions. One reason for this, as noted above, is that interfacing with OLAP systems often requires technical expertise that is only possessed by relatively few individuals in a business organization. It is often necessary to learn a new programming interface in order to operate the OLAP system. Also, because OLAP systems are proprietary and relatively expensive, installation of OLAP clients is not universal among business employee computer systems. Generally, only those who have a need to interface with the OLAP system will have the OLAP client installed on their desktop computer. Another limitation of OLAP systems is that they typically have only limited formatting options available. As a result, reports generated by OLAP systems are frequently exported and used in other applications, such as, for example, business productivity clients whose installation and use is often more universal.

Business productivity clients, such as the MICROSOFT OFFICE suite of business applications are rapidly becoming the preferred method of retaining, visualizing and conveying business information. MICROSOFT OFFICE includes fundamental business applications including ACCESS database, EXCEL spreadsheet, MSWORD word processor and POWERPOINT presentation tool. These applications allow users to create sophisticated documents and visual presentations that transform raw business data into an aesthetically pleasing and meaningful format. As a result, their use in the business world has become nearly universal.

A drawback associated with exporting reports generated in an OLAP system to a business productivity client is that it is still necessary to learn the interfaces for both the OLAP client and the productivity client in order to run the report, export the data and merge it into a document in the productivity client. Moreover, this data, once merged into the productivity client, remains static. That is, if at a later data, the report from which the data was obtained is re-run, either to include new information or based on different parameters, this data must be once again taken from the report and imported or pasted into the document of the productivity client. Pasting the report data into a document of the productivity client is an inefficient process because it requires accessing both the OLAP client the productivity client. Moreover, the resulting document will likely include formatting from both the OLAP system as well as the productivity client which can lead to undesirable visual effects and even document corruption. Merging or exporting data from the OLAP system into the productivity client also requires accessing both the OLAP client and the productivity client. This too can cause undesirable and/or unintended changes to the resulting productivity client document, particularly, if the updated report is different than the one that it is replacing.

Therefore, these and other drawbacks exist with respect to conventional methods of bringing report data from an OLAP system into a document created in a business productivity client.

SUMMARY OF THE INVENTION

In view of the foregoing shortcomings of conventional methods of merging data from a business intelligence system with a productivity client, various embodiments may provide an interface client for a business productivity client that is operable to permit the productivity client to access a business intelligence system natively within the productivity client over a computer network.

Various embodiments of the present invention may also provide an interface client for a business productivity client that is operable to permit the productivity client to access a business intelligence system over a computer network, and preferably over the Internet.

Various embodiments of the present invention may further provide an interface client for a business productivity client that is operable to permit reports to be run and refreshed from within the business productivity client.

Various embodiments of the present invention may additionally provide an interface client for a business productivity client that is operable to refresh data from a business intelligence report contained in a document of the business productivity client through the business productivity client.

Various embodiments of the present invention may also provide an interface client for a business productivity client that stores persistence information regarding a business intelligence report on a business intelligence server and productivity client-specific formatting information that permits business intelligence report information contained in a productivity client document to be refreshed while preserving the existing formatting of the report information within the productivity client document.

Various embodiments of the present invention may additionally provide a method for rendering a productivity client operable to access business intelligence information from an on-line business intelligence server.

Various embodiments of the present invention may provide a method for updating information in a productivity client file from a network-based business intelligence system directly in the productivity client.

To achieve the objects and in accordance with the purpose of the invention, as embodied and broadly described herein, this invention, in one embodiment, a network-based system for accessing and updating information from an on-line business intelligence system through a productivity client is provided. The network-based system for accessing and updating information from an on-line business intelligence system through a productivity client according to this embodiments comprises a multi-level interface client that provides access to report files in the business intelligence system to at least one productivity client, the multi-level interface client comprising a graphical user interface (GUI) layer, an application program interface (API) layer, a productivity client adapter layer and a kernel layer.

In another embodiment according to this invention, a multi-level business intelligence system interface client for use with at least one productivity client is provided. The multi-level business intelligence system interface client according to this embodiment comprises a GUI layer, an API layer, a productivity client adapter layer and a kernel layer.

In an additional embodiment according to this invention, a method for rendering a productivity client operable to access business intelligence information from an on-line business intelligence server is provided. The method according to this embodiment comprises registering a COM add-in for the productivity client, invoking the productivity client, selecting, from a tool bar associated with the COM add-in, a tool bar button operable to invoke a GUI of a multi-layer interface client, using the GUI, defining a Smart Tag action relating to a business intelligence report generated by a business intelligence server, wherein when selected, the Smart Tag action calls an API layer of the multi-layer interface client which in turn causes a kernel layer of the multi-layer interface client to access the on-line business intelligence server over a communication network.

These and other features and advantages of the preferred embodiments will become more readily apparent when the detailed description of the preferred embodiments is read in conjunction with the attached drawings. The accompanying drawings, which are incorporated in and constitute a part of this specification, illustrate the embodiments of the invention and, together with the description, serve to explain the principles of the invention.

BRIEF DESCRIPTION OF THE DRAWINGS

FIG. 6 is a flow chart detailing the steps of a method for rendering a productivity client operable to access business intelligence information from an on-line business intelligence server in accordance with one or more embodiments of the invention; and FIG. 7 is a flow chart detailing the steps of a method for updating information in a productivity client file from a network-based business intelligence system directly in the productivity client in accordance with various embodiments of the invention.

DETAILED DESCRIPTION OF THE INVENTION

The following description is intended to convey a thorough understanding of the invention by providing specific embodiments and details involving business intelligence systems and systems and methods for interacting with a business intelligence system with a business productivity client using a multi-level interface client. It is understood, however, that the invention is not limited to these specific embodiments and details, which are exemplary only. It further is understood that one possessing ordinary skill in the art, in light of known systems and methods, would appreciate the use of the invention for its intended purposes and benefits in any number of alternative embodiments, depending upon specific design and other needs.

As used herein, the term "business intelligence system" may be understood to refer to any type of computer system that utilizes one or more on-line analytical processing systems including, but not limited to ROLAP, MOLAP, and HOLAP systems. For example, this term may refer to a business intelligence system such as the MICROSTRATEGY 7i business intelligence platform available from MicroStrategy Inc., of McLean, Va.

As used herein, the terms "productivity client," "business productivity client," "productivity suite" and "business productivity suite" may be understood to refer to any type of software application typically utilized to enhance productivity such as a word processing software client, a spreadsheet software client, a presentation software client and a database software client. In one embodiment, "productivity suite" will refer to the MICROSOFT OFFICE suite of productivity clients including the MSWORD word processor client, the EXCEL spreadsheet client, the POWERPOINT presentation client and the ACCESS database client.

Exemplary System Platform

Figure 1:
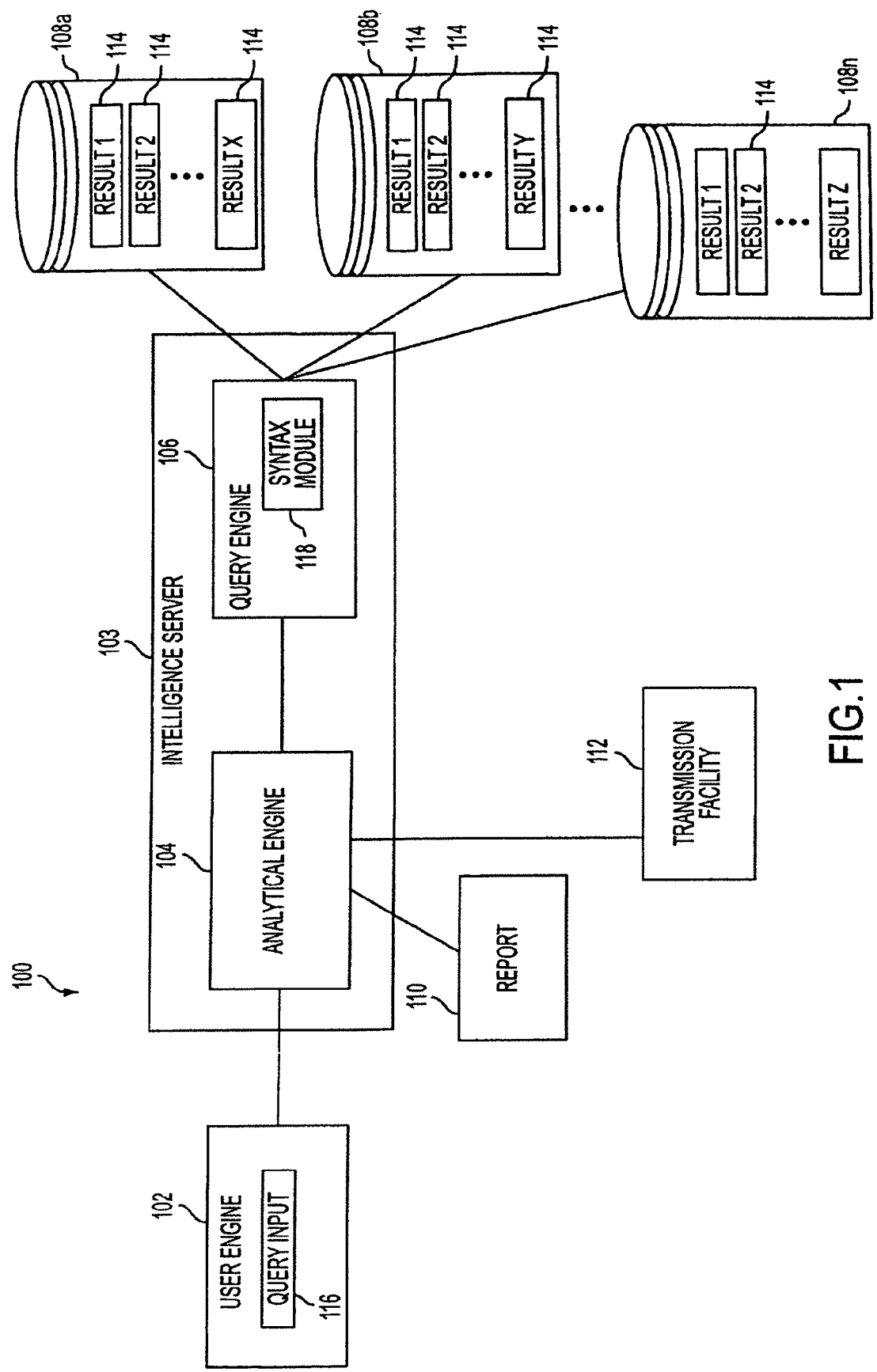
FIG. 1 is a block diagram illustrating an architecture for a reporting system for use with one or more embodiments of the invention.

Referring now to FIG. 1, FIG. 1 is a block diagram illustrating an architecture for a reporting system 100 by which a variety of data resources may be accessed for business analytic, report generation and other intelligence purposes for use with embodiments of the invention. According to one embodiment, the reporting system 100 may comprise a business intelligence, Online Analytical Processing (OLAP) decision support system (DSS) or other reporting system. In particular, FIG. 1 may comprise a portion of the MicroStrategy 7i platform which provides an exemplary system in which one or more embodiments of the present invention may be implemented.

In general, through using the reporting system 100, analysts, managers and other users may query or interrogate a plurality of databases or database arrays to extract demographic, sales, and/or financial data and information and other patterns from records stored in such databases or database arrays to identify strategic trends. Those strategic trends may not be discernable without processing the queries and treating the results of the data extraction according to the techniques performed by the systems and methods described herein. This is in part because the size and complexity of some data portfolios stored in such databases or database arrays may mask those trends.

In addition, the reporting system 100 may enable the creation of reports or the provision of services that are processed according to a predetermined schedule. The user may then subscribe to the services, provide personalization criteria and have the reports automatically delivered to the user, as described in U.S. Pat. No. 6,154,766 to Yost et al. (the "'766 patent"), which is commonly assigned and hereby incorporated by reference in its entirety.

As illustrated in FIG. 1, a business, a government or another user may access the resources of the reporting system 100 using a user engine 102. The user engine 102 may include a query input module 116 to accept a plurality of searches, queries or other requests, via a query box on a graphical user interface (GUI) or another similar interface. The user engine 102 may communicate with an analytical engine 104. The analytical engine 104 may include a set of extensible modules to run a plurality of statistical analyses, to apply filtering criteria, to perform a neural net technique or another technique to condition and treat data extracted from data resources hosted in the reporting system 100, according to a query received from the user engine 102.

The analytical engine 104 may communicate with a query engine 106, which in turn interfaces to one or more data storage devices 108a, 108b . . . 108n (where n is an arbitrary number). The data storage devices 108a, 108b . . . 108n may include or interface to a relational database or another structured database stored on a hard disk, an optical disk, a solid state device or another similar storage media. When implemented as databases, the data storage devices 108a, 108b . . . 108n may include or interface to, for example, an Oracle™ relational database such as sold commercially by Oracle Corporation, an Informix™ database, a Database 2 (DB2) database, a Sybase™ database, or another data storage device or query format, platform or resource such as an OLAP format, a Standard Query Language (SQL) format, a storage area network (SAN), or a Microsoft Access™ database. It should be understood that while data storage devices 108a, 108b . . . 108n are illustrated as a plurality of data storage devices, in some embodiments the data storage devices may be contained within a single database or another single resource.

Any of the user engine 102, the analytical engine 104 and the query engine 106 or other resources of the reporting system 100 may include or interface to or be supported by computing resources, such as one or more associated servers. When a server is employed for support, the server may include, for instance, a workstation running a MICROSOFT WINDOWS XP operating system, MICROSOFT WINDOWS NT operating system, a MICROSOFT WINDOWS 2000 operating system, a Unix operating system, a Linux operating system, a Xenix operating system, an IBM AIX operating system, a HEWLETT-PACKARD UX operating system, a NOVELL NETWARE operating system, a SUN MICROSYSTEMS SOLARIS operating system, an IBM OS/2 operating system, a BeOS operating system, a APPLE OSX operating system, an Apache platform, an OPENSTEP operating system, or another similar operating system or platform. According to one embodiment of the present invention, the analytical engine 104 and the query engine 106 may comprise elements of an intelligence server 103.

The data storage devices 108a, 108b . . . 108n may be supported by a server or another resource and may, in some embodiments, include redundancy, such as a redundant array of independent disks (RAID), for data protection. The storage capacity of any one or more of the data storage devices 108a, 108b . . . 108n may be of various sizes, from relatively small data sets to very large database (VLDB)-scale data sets, such as warehouses holding terabytes of data or more. The fields and types of data stored within the data storage devices 108a, 108b . . . 108n may also be diverse, and may include, for instance, financial, personal, news, marketing, technical, addressing, governmental, military, medical or other categories of data or information.

The query engine 106 may mediate one or more queries or information requests from those received from the user at the user engine 102 to parse, filter, format and otherwise process such queries to be submitted against the data contained in the data storage devices 108a, 108b . . . 108n. Thus, a user at the user engine 102 may submit a query requesting information in SQL format, or have the query translated to SQL format. The submitted query is then transmitted via the analytical engine 104 to the query engine 106. The query engine 106 may determine, for instance, whether the transmitted query may be processed by one or more resources of the data storage devices 108a, 108b . . . 108n in its original format. If so, the query engine 106 may directly transmit the query to one or more of the resources of the data storage devices 108a, 108b . . . 108n for processing.

If the transmitted query cannot be processed in its original format, the query engine 106 may perform a translation of the query from an original syntax to a syntax compatible with one or more of the data storage devices 108a, 108b . . . 108n by invoking a syntax module 118 to conform the syntax of the query to standard SQL, DB2, Informix™, Sybase™ formats or to other data structures, syntax or logic. The query engine 106 may likewise parse the transmitted query to determine whether it includes any invalid formatting or to trap other errors included in the transmitted query, such as a request for sales data for a future year or other similar types of errors. Upon detecting an invalid or an unsupported query, the query engine 106 may pass an error message back to the user engine 102 to await further user input.

When a valid query such as a search request is received and conformed to a proper format, the query engine 106 may pass the query to one or more of the data storage devices 108a, 108n . . . 108n for processing. In some embodiments, the query may be processed for one or more hits against one or more databases in the data storage devices 108a, 108b . . . 108n. For example, a manager of a restaurant chain, a retail vendor or another similar user may submit a query to view gross sales made by the restaurant chain or retail vendor in the State of New York for the year 1999. The data storage devices 108a, 108b . . . 108n may be searched for one or more fields corresponding to the query to generate a set of results 114.

Although illustrated in connection with each data storage device 108 in FIG. 1, the results 114 may be generated from querying any one or more of the databases of the data storage devices 108a, 108b . . . 108n, depending on which of the data resources produce hits from processing the search query. In some embodiments of the reporting system 100 of the invention, the results 114 may be maintained on one or more of the data storage devices 108a, 108b . . . 108n to permit one or more refinements, iterated queries, joinders or other operations to be performed on the data included in the results 114 before passing the information included in the results 114 back to the analytical engine 104 and other elements of the reporting system 100.

When any such refinements or other operations are concluded, the results 114 may be transmitted to the analytical engine 104 via the query engine 106. The analytical engine 104 may then perform statistical, logical or other operations on the results 114 for presentation to the user. For instance, the user may submit a query asking which of its retail stores in the State of New York reached $1M in sales at the earliest time in the year 1999. Or, the user may submit a query asking for an average, a mean and a standard deviation of an account balance on a portfolio of credit or other accounts.

The analytical engine 104 may process such queries to generate a quantitative report 110, which may include a table or other output indicating the results 114 extracted from the data storage devices 108a, 108b . . . 108n. The report 110 may be presented to the user via the user engine 102, and, in some embodiments, may be temporarily or permanently stored on the user engine 102, a client machine or elsewhere, or printed or otherwise output. In some embodiments of the reporting system 100 of the invention, the report 110 or other output may be transmitted to a transmission facility 112, for transmission to a set of personnel via an email, an instant message, a text-to-voice message, a video or via another channel or medium. The transmission facility 112 may include or interface to, for example, a personalized broadcast platform or service such as the NARROWCASTER platform or TELECASTER service sold by MicroStrategy Incorporated or another similar communications channel or medium. Similarly, in some embodiments of the invention, more than one user engine 102 or other client resource may permit multiple users to view the report 110, such as, for instance, via a corporate intranet or over the Internet using a Web browser. Various authorization and access protocols may be employed for security purposes to vary the access permitted users to such report 110 in such embodiments.

Additionally, as described in the '766 patent, an administrative level user may create a report as part of a service. Subscribers/users of the service may then receive access to reports through various types of data delivery devices including telephones, pagers, computers, PDAs, WAP protocol devices, email, facsimile, and many others. In addition, a subscriber/user may specify trigger conditions so that the subscriber/user receives a report only when a trigger condition has been satisfied, as described in detail in the '766 patent. The reporting system 100 of FIG. 1 may have many other uses, as described in detail with respect to the MICROSTRATEGY 7x platforms, the details of which will be appreciated by one of ordinary skill in the reporting and decision support system art.

Exemplary Network Arrangement

Figure 2:
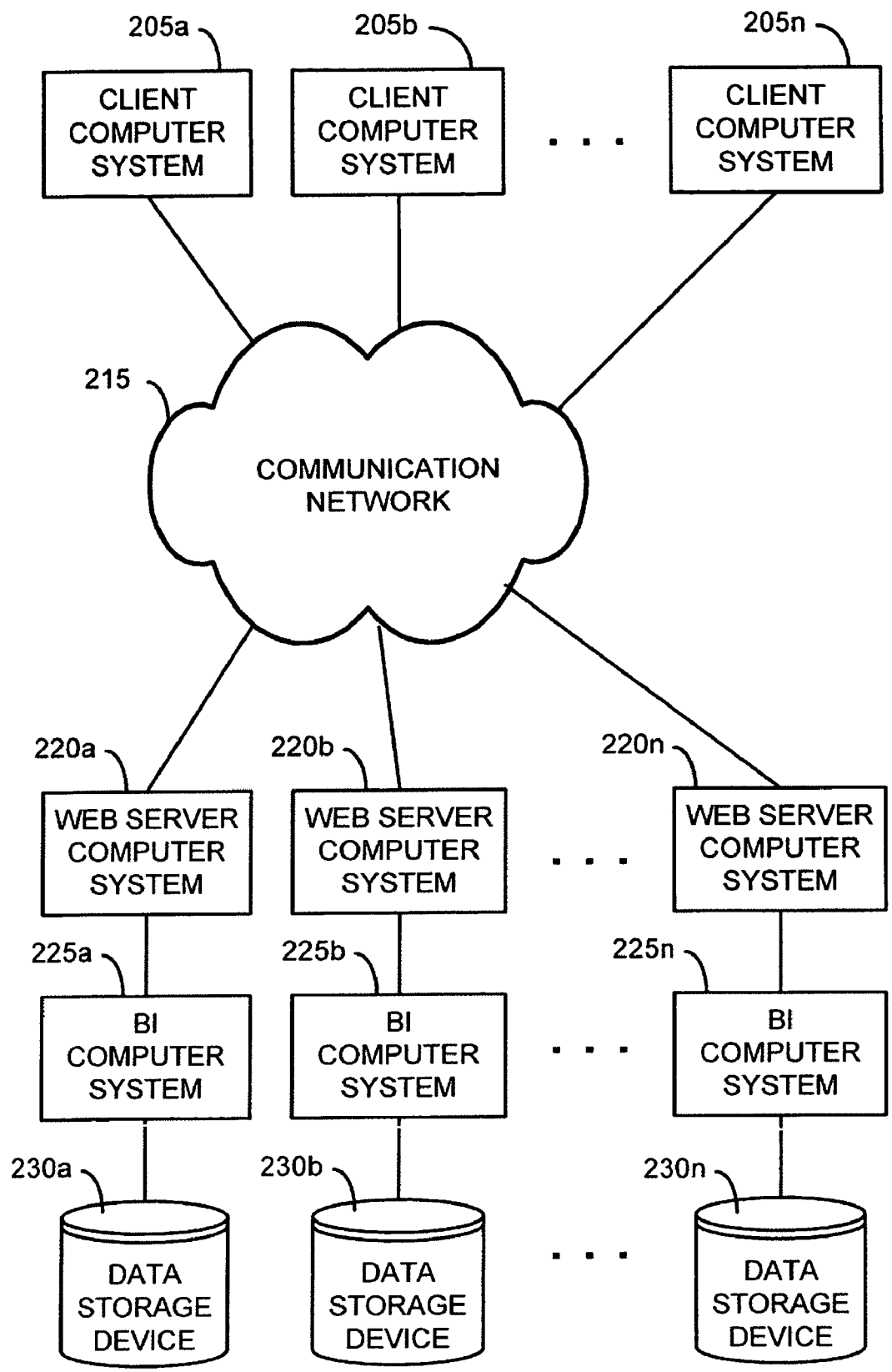
FIG. 2 is a block diagram illustrating a system architecture of an exemplary computer network for use with one or more embodiments of the invention.

Referring now to FIG. 2, FIG. 2 is a block diagram illustrating a system architecture of an exemplary computer network for use with embodiments of the invention. In particular, one or more client devices 205a, 205b . . . 205n (where n is an arbitrary number), executing a client browser application that supports the HTTP protocol, at least one business productivity client and a multi-layer interface application in accordance with embodiments of the invention, are connected, typically through an Internet Service Provider (ISP) to a computer network 215, such as the Internet. Further, one or more web server computer systems 220a, 220b . . . 220n (where n is an arbitrary number), executing one or more web server applications are also coupled to the computer network 215 through an ISP. In one embodiment, a plurality of web server computer systems 220a, 220b . . . 220n are operatively joined together to form a server cluster, thereby improving the performance of the web server applications being executed thereon.

In accordance with one embodiment of the present invention, one or more business intelligence server computer systems 225a, 225b . . . 225n are operatively connected to the one or more web servers computer systems 220a, 220b . . . 220n for providing the analytical and querying functions described above in relation to the system of FIG. 1. As will be described in additional detail below, the one or more web server computer systems and the one or more business intelligence computer systems are configured to format, send and receive information utilizing a specialized transmission protocol implementing extensible markup language (XML).

In an embodiment of the invention, upon receiving an HTTP query request, the web server application transmits the request to at least one of the business intelligence server applications residing on the business intelligence server computer systems 225. Upon receipt of the request, the business intelligence server computer system 225 may then communicate with one or more data storage devices 230a-230n such as is disclosed in commonly assigned U.S. Pat. No. 6,691,100 hereby incorporated by reference in its entirety.

In the above-described embodiment, once the requested information has been retrieved, the entire process is reversed. In particular, the retrieved information is transmitted to the web server computer system 220 and returned to the client device 205 via the computer network 215.

Exemplary User System

Figure 3:
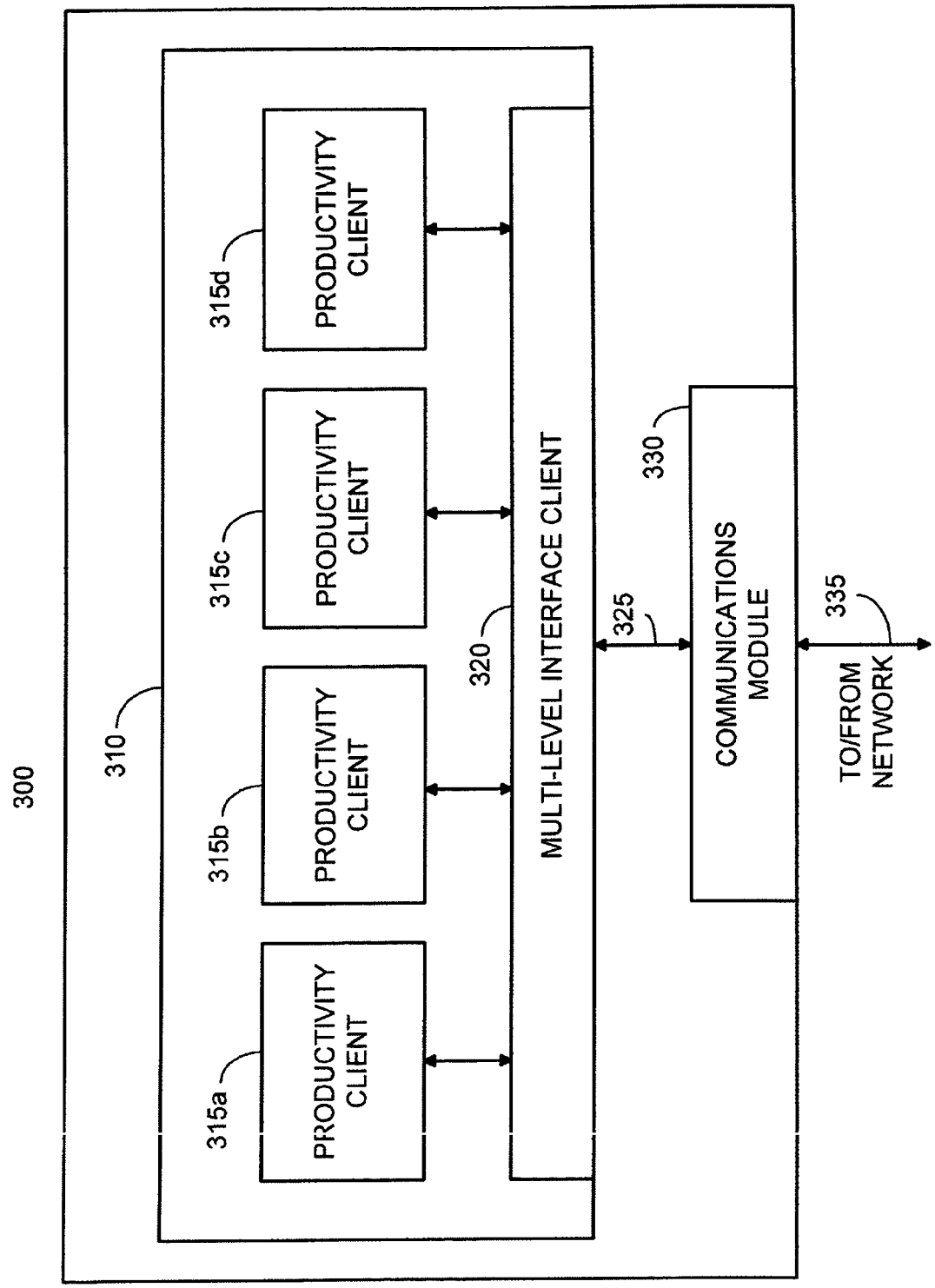
FIG. 3 is a block diagram illustrating a client computer system including a multiple business productivity clients and an interface client in accordance with one or more embodiments of the invention.

Referring now to FIG. 3, FIG. 3 is a block diagram illustrating a client computer system including multiple business productivity clients and an interface client in accordance with embodiments of the invention. The client computer system 300 shown in FIG. 3 includes a memory device 310 having stored therein a plurality of business productivity client applications and a multi-level interface client 320. The client computer system also comprises a communications module 330 that communicates with the software applications in the memory device 310 over a bus 325. The communication module provides a physical interface to the communication network 335. In various exemplary embodiments, the communication module 330 is a network interface card (NIC). However, in various other exemplary embodiments, the communication module 330 will be modem, including but not limited to a plaid old telephone system (POTS) modem, a cable modem and a DSL modem. Furthermore, though the communication module 330 is shown as being internal to the client computer system 300, the communication module 330 may be external to the client computer system and in wired or wireless communication therewith.

The multi-level interface client 320 provides access to remote business intelligence server functions to the business productivity client applications 315a, 315b, 315c and 315d. For purposes of example only, four business productivity clients, a word processor client 315a, a spreadsheet client 315b, a presentation client 315c and a database client 315d are illustrated in FIG. 3. However, it should be appreciated that the multi-level interface client 320 may support either more or less business productivity clients than the four shown in FIG. 3 and including additional and even other business productivity clients than those shown in the figure. Furthermore, as shown in FIG. 3, the multi-level interface client 320 is depicted as a single application that serves all the productivity clients 315a-d. It should be appreciated that the interface client 320 may comprise separate instances for each productivity client 315 being supported. In such an arrangement, the interface client 320 would actually be depicted as separate boxes, with one box for each supported client 315 and wherein each box is representative of a separate instance of the interface client in the memory 310.

Figure 4:
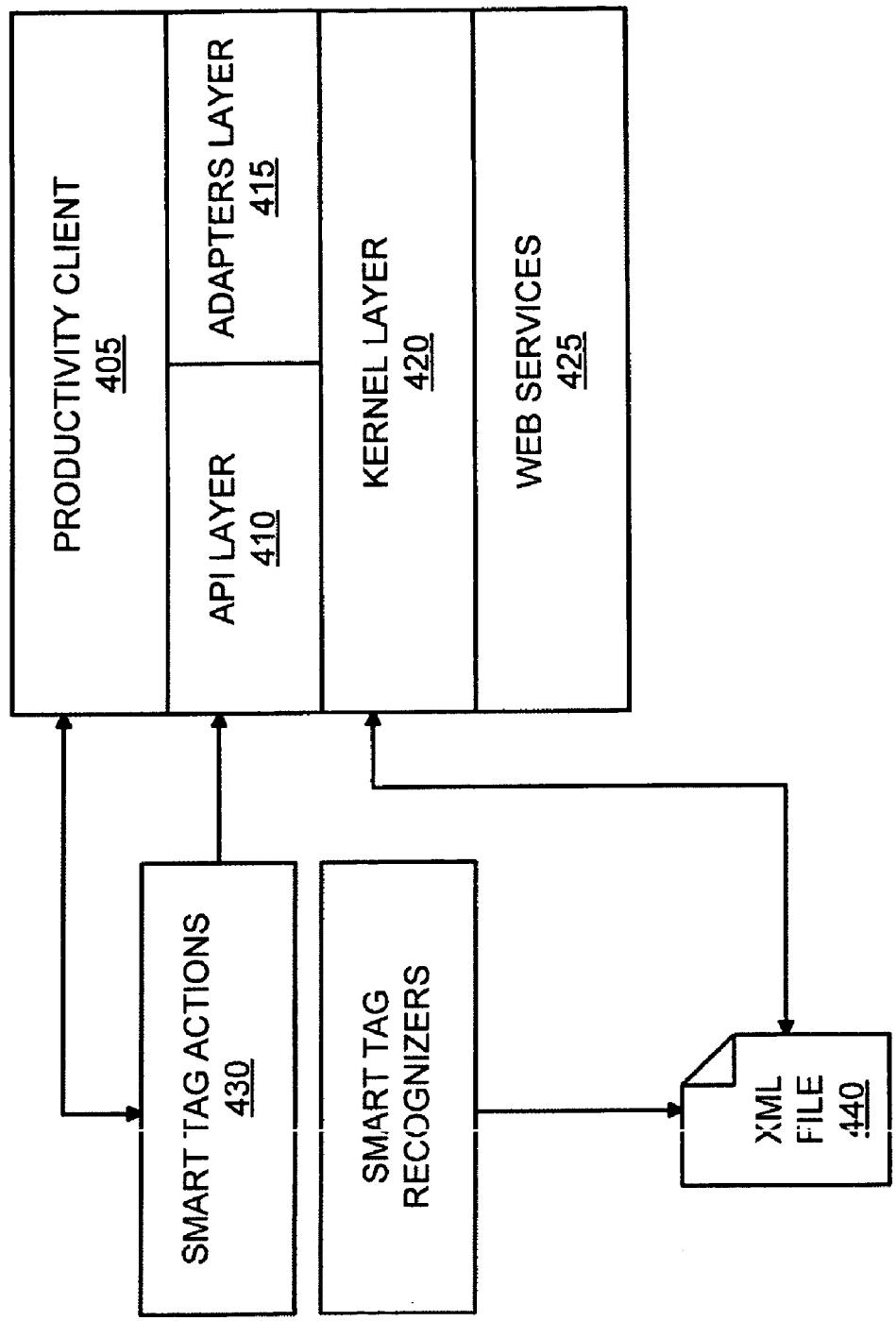
FIG. 4 is a block diagram illustrating a system architecture of a multi-level interface client for use with a business productivity suite in accordance with one or more embodiments of the invention.

Referring now to FIG. 4, FIG. 4 is a block diagram illustrating a system architecture of a multi-level interface client for use with a business productivity suite in accordance with embodiments of the invention. The productivity client layer represents business productivity client applications that are supported by the multi-level interface client. In one embodiment this may include productivity clients from the MICROSOFT OFFICE business productivity suite of client applications, such as, for example, MS WORD, EXCEL spreadsheet, POWERPOINT presentation and ACCESS database. The multi-level interface client implements the IDTExtensibility2 interface used by MS OFFICE applications to load component object model (COM) add-ins. Registering the interface client as a OFFICE add-in causes OFFICE to load the interface client and call its OnConnection method when a supported client application loads. When loaded into a supported OFFICE application, the COM add-in adds a toolbar to the application that is used to launch the GUI of the interface client.

The API layer 410 allows custom integration with productivity client applications 405. In various exemplary embodiments, the custom integration may include macros and/or Visual Basic for Applications (VBA) programming, and/or MICROSOFT .NET language programming, and/or COM language programming. The API layer 410 provides an interface that allows a programmer to customize business intelligence interaction functions available to the productivity client(s) 405.

The adapters layer 415 provides application specific functionality for the supported productivity clients. In various embodiments, the interface client of the present invention provides business intelligence operations that are common to all OFFICE applications as well as ones that are specific to a particular application. For example, operations such as connect to project source, browse folders, browse History List and execute reports are common operation available to any supported OFFICE productivity client. However, other operations, primarily operations relating to displaying report results, are specific to particular productivity client. These client-specific operations include operations such as, for example, display in EXCEL grid, display in WORD table, display in EXCEL PivotChart, display in ACCESS table, etc. The adapters layer 415 provides theses client-specific operations to the client layer 405.

The interface client kernel layer 420 is the central module of the interface client. The kernel layer 420 provides Web Services functionality to the productivity client layer 405 allowing it to access the remote business intelligence server over the web using the Web Services protocol. The kernel layer 420 allows the API layer 410 and the adapters layer 415 to expose Web Services functionality to the custom programs and productivity client applications respectively. The kernel layer 420 also modifies the Smart Tag XML file 440. The Smart Tag actions are executed from Smart Tag pop-up dialogs in Smart Tag enabled productivity clients. Selecting a Smart Tag action causes interface client functionality to be executed via the API layer 410. Smart Tag recognizers 435 are run on background threads by productivity client applications. When a Smart Tag term is recognized in a document, Smart Tag actions are presented to the user in pop-up dialog box.

The interface client of FIG. 4 may support MICROSOFT OFFICE Smart Tags representing MICROSTRATEGY reports and projects which may be proprietary. Smart Tags may be defined by a user or programmer using the interface client user interface. When a Smart Tag term is defined, information about the term is stored in the XML file 440 in the user's file system. The Smart Tag recognizer 435 of the interface client reads the XML file when it is loaded into a Smart Tag-enabled productivity client. The multi-level client interface user interface is used to write to the XML file. To facilitate data exchange between the GUI and the Smart Tag recognizer, an XML schema (.xsd) file is used to define the XML format. The XML format is a simply a list of elements containing information about the business intelligence reports (ri elements) and the business intelligence projects (pi elements). In staying consistent with the format of a default report results XML, the XML format file may contain a root information element (mi element) that contains the detail elements. For a thorough description of report results XML refer to commonly assigned U.S. Pat. No. 6,658,432 hereby incorporated by reference in its entirety. Each report or project information element contains a number of attributes that provide information useful for Smart Tag actions to interact with the business intelligence server. Because additional properties may be added over time, persistence information may be versioned for different versions of the interface client according to embodiments of the invention. When processing Smart Tag XML, the interface client checks the version property to determine which attributes to query.

Table 1.1 below lists exemplary report information attributes in accordance with embodiments of this invention.

TABLE 1.1

Report Information Attributes

| Attribute | Full Name | Type | Values | Version |
|---|---|---|---|---|
| ver | Persistence XML version | string | 1 | 1 and up |
| name | Report name | string | MicroStrategy report name | All |
| id | Report ID | string | MicroStrategy report ID | All |
| ps | Project Source | string | MicroStrategy project source containing the report | All |
| srv | Intelligence Server | string | MicroStrategy Intelligence Server where the report was executed | All |
| prj | MicroStrategy project | string | MicroStrategy project containing the report | All |
| li | Login ID | string | Optional login ID - MicroStrategy, NT domain/login, LDAP, or database | All |
| am | Authentication mode | string enum | s: standard, l: LDAP, n: Windows NT, g: guest, p: pass-through, w: Windows pass-through | All |
| alias | Report alias | string | Name to be recognized by the Smart Tag recognizer | All |

Table 1.2 lists exemplary project information attributes in accordance with embodiments of this invention.

TABLE 1.2

Project Information Attributes

| Attribute | Full Name | Type | Values | Version |
|---|---|---|---|---|
| ver | Persistence XML version | string | 1 | 1 and up |
| name | Project name | string | MicroStrategy project name | All |
| id | Project ID | string | MicroStrategy project ID | All |
| ps | Project Source | string | MicroStrategy project source containing the project | All |
| srv | Intelligence Server | string | MicroStrategy Intelligence Server containing the project | All |
| li | Login ID | string | Optional login ID - MicroStrategy, NT domain/login, LDAP, or database | All |
| am | Authentication mode | string enum | s: standard, l: LDAP, n: Windows NT, g: guest, p: pass-through, w: Windows pass-through | All |
| alias | Report alias | string | Name to be recognized by the Smart Tag recognizer | All |

An exemplary Smart Tag XML utilizing various report and project attributes from tables 1.1 and 1.2 respectively is listed below:

Sample Smart Tag XML

<?xml version="1.0" ?>
<mi>
<ri ver="1" name="Customer Revenue—filter on customer ID (attribute expression prompt)" id="AA76B5944372989BDA47758E62F87914" ps="d_lettington11" srv="d_lettington11" prj="MicroStrategy Tutorial" li="administrator" am="s" alias="Customer Revenue—filter on customer ID (attribute expression prompt)"/>
<ri ver="1" name="Employees—filter by hire date (date prompt)" id="CC523A3F421361E36185E7DBBDB21E5E1" ps="Catseye" srv="CATSEYE" prj="MicroStrategy Tutorial" li="administrator" am="n" alias="Employees—filter by hire date (date prompt)" />
<ri ver="1" name="Inventory and Unit Sales—TVs (element list prompt)" id="BC9AD8354D2588DCCBE0D2A278ED59D2" ps="Carlsbad" srv="Carlsbad" prj="Aqueduct" li="administrator" am="l" alias="Inventory and Unit Sales—TVs (element list prompt)"/>
<ri ver="1" name="Region/Quarter—select metric (object prompt)" id="2B7985174D105A7A9D79F78297E75DF8" ps="d_lettington11" srv="d_lettington11" prj="MicroStrategy Tutorial" li="" am="g" alias="Sales" />
<pi ver="1" name="MicroStrategy Tutorial" id="B19DEDCC11D4E0EFC000EB9495D0F44F" ps="d_lettington11" srv="d_lettington11" li="administrator" am="s" alias="Sales"/>
</mi>

Appendix A included with this application includes a code listing for an exemplary Smart Tag XML schema file. It should be appreciated that the code listing in Appendix A is exemplary only. Actual implementations may vary from the listing of Appendix A without departing from the spirit or scope of this invention.

With continued reference to FIG. 4, the Web Services layer 425 may be configured so that it is a not a physical component of the interface client of the present invention. However Web Services are referenced by the interface client to interact with the business intelligence server over the web. Web Services define a simple API to the proprietary business intelligence server via simple object access protocol (SOAP) and hyper text transfer protocol (HTTP). By referencing Web Services from the interface client, the interface client can be a thin client by pushing intelligence server interaction to the web server machine receiving the Web Services commands from the interface client.

Within each business intelligence report executed by the interface client, information may be stored that allows the report to be refreshed while preserving the formatting of the particular interface client document. In various exemplary embodiments, this information may be designed as persistence information. The persistence information contains details about the report itself the connection used to execute it, display properties, and layout information specific to the particular productivity client in which the report information is displayed. The interface client of the present invention causes the information to be stored in the productivity client document. Therefore, if the document is, for example, emailed to other persons' within an organization, as long as those other persons have the interface client installed on their computer, they can open the document and retain the business intelligence functionality as well as preserving formatting and layout of the report in the document.

In various embodiments of the invention, persistence XML may be implemented as a single element tag with multiple attributes including core elements that appear in all persistence XML and a set of attributes specific to each supported OFFICE productivity application. Each supported application stores the persistence information in a different way. For example, in EXCEL spreadsheet it is written to a hidden worksheet. In POWERPOINT, it is written to a hidden textbox control outside of the slide in which the report appears. In MSWORD, persistence information is written in a hidden font in a row in a table that also contains the report output.

Table 1.3 lists exemplary common persistence attributes in accordance with embodiments of this invention. The list is exemplary only and not mean to be conclusive. More or less attributes may be use and even other attributes not shown in the table.

TABLE 1.3

Common Persistence Attributes

| Attribute | Full Name | Type | Values | Version |
|---|---|---|---|---|
| app | Microsoft Office application | string enum | e: Excel, p: PowerPoint, w: Word | All |
| ver | Persistence XML version | string | 1, 2, 3, 4 | 1 and up |
| name | Report name | string | MicroStrategy report name | All |
| id | Report ID | string | MicroStrategy report ID | All |
| path | Report path | string | Path of the report when it was last executed | 3 and up |
| ps | Project Source | string | MicroStrategy project source containing the report | All |
| srv | Intelligence Server | string | MicroStrategy Intelligence Server where the report was executed | All |
| prj | MicroStrategy project | string | MicroStrategy project containing the report | All |
| li | Login ID | string | Optional login ID - MicroStrategy, NT domain/login, LDAP, or database | All |
| am | Authentication mode | string enum | s: standard, l: LDAP, n: Windows NT, g: guest, p: pass-through, w: Windows pass-through | All |
| rows | Report rows | string | Number of rows in the report result | All |
| cols | Report columns | string | Number of columns in the report result | All |
| pa | Present as | string enum | 0: grid, 1: chart, 2: flattened, 3: implicit, 4: PivotTable, 5: PivotChart, 6: grid implicit, 7: chart implicit | All |
| ut | Last update time | string | Date and time the report was last executed | All |
| hs | Hide source data for graph | string enum | 0, 1 | All |
| ks | Keep source data with graph | string enum | 0, 1 | All |
| cn | Chart name | string | Name of the Microsoft Office chart object | All |
| ct | Chart type | string enum | b: bar, c: column, l: line, p: pie, a: area, u: bubble, r: radar, t: scatter, f: surface, x: none | All |
| c3 | 3-dimensional chart | string enum | 0, 1 | All |
| fmt | Apply MicroStrategy formatting | string enum | 0, 1 | All |
| saf | Show attribute forms in headers | string enum | 0, 1 | All |
| afg | Autofit columns in grid | string enum | 0, 1 | 2 and up |
| ptn | PivotTable name | string | Name of the Microsoft Excel PivotTable | 3 and up |
| lck | Lock persistence | string enum | 0, 1 | All |

Tables 1.4, 1.5 and 1.6 list exemplary client-specific persistence attributes for EXCEL spreadsheet, POWERPOINT presentation and MSWORD respectively in accordance with embodiments of the invention.

TABLE 1.4

EXCEL Attributes

| Attribute | Full Name | Type | Values | Version |
|---|---|---|---|---|
| ews | Excel worksheet | string | Worksheet where the report is displayed | All |
| ece | Excel cell | string | Excel cell where the upper-left-hand cell of the report is located | All |
| ecr | Excel chart resident sheet | string | Worksheet where chart source data is stored (replaced by eds in version 4) | 3 and lower |
| ect | Excel chart top | string | Chart top location | All |
| ecl | Excel chart left | string | Chart left location | All |
| ech | Excel chart height | string | Chart height in pixels | All |
| ecw | Excel chart width | string | Chart width in pixels | All |
| oes | Original Excel worksheet | string | Original worksheet where the report was displayed | 3 and up |
| oec | Original Excel cell | string | Original cell where the report was displayed | 3 and up |
| eds | Excel data worksheet | string | Excel worksheet for chart source data | 4 and up |

TABLE 1.5

POWERPOINT Attributes

| Attribute | Full Name | Type | Values | Version |
|---|---|---|---|---|
| psn | PowerPoint slide number | string | PowerPoint slide ID (not number of the slide in the presentation) | All |
| pid | PowerPoint object ID | string | ID of the embedded Excel workbook or picture representing the MicroStrategy report | All |
| pdid | PowerPoint data ID | string | | All |
| ppt | PowerPoint paste type | string enum | 1: embedded Excel workbook, 2: picture, 3: default | 3 and up |
| pph | PowerPoint paste height | string | Height in pixels of the report or chart | 4 and up |
| ppw | PowerPoint paste width | string | Width in pixels of the report or chart | 4 and up |
| ppleft | PowerPoint left position | string | Left position of the report or chart | 4 and up |
| pptop | PowerPoint top position | string | Top position of the report or chart | 4 and up |
| pphd | PowerPoint paste height for data | string | Height in pixels of the chart source data (only present for chart with keep source data with chart) | 4 and up |
| ppwd | PowerPoint paste width for data | string | Width in pixels of the chart source data (only present for chart with keep source data with chart) | 4 and up |
| ppleftd | PowerPoint left position for data | string | Left position of the chart source data (only present for chart with keep source data with chart) | 4 and up |
| pptopd | PowerPoint top position for data | string | Top position of the chart source data (only present for chart with keep source data with chart) | 4 and up |

TABLE 1.6

MSWORD Attributes

| Attribute | Full Name | Type | Values | Version |
|---|---|---|---|---|
| wpt | Word paste type | string enum | 1: embedded Excel workbook, 2: picture, 3: default | 3 and up |

Exemplary persistence XML for affecting Grid Report and Graph Report operations for EXCEL spreadsheet, POWERPOINT presentation and MSWORD word processor utilizing the common and client-specific attributes from tables 1.3, 1.4 and 1.5 above are listed below.

Sample EXCEL Persistence XML

Grid Report

<mi app="e" ver="4" name="Electronics Revenue vs. Forecast 2003" id="EB3CD5D14F4C8C77782AC0882C986B8D" path="Public Objects\Reports\Electronics Revenue vs. Forecast 2003" ps="MicroStrategy Tutorial" srv="localhost" prj="MicroStrategy Tutorial" li="Administrator" am="s" rows="21" cols="11" pa="6" ut="Apr. 30, 2004 12:23:16 PM" hs="1" ks="1" cn="" ct="x" c3="1" fmt="1" saf="0" afg="0" ptn="" lck="0" ews="Sheet1" oes="Sheet1" ece="A1" oec="A1" eds="" ect="0" ecl="0" ech="0" ecw="0"/>

Graph Report

<mi app="e" ver="4" name="Electronics Revenue vs. Forecast 2003" id="EB3CD5D14F4C8C77782AC0882C986B8D" path="Public Objects\Reports\Electronics Revenue vs. Forecast 2003" ps="MicroStrategy Tutorial" srv="localhost" prj="MicroStrategy Tutorial" li="Administrator" am="s" rows="73" cols="6" pa="1" ut="Apr. 30, 2004 12:24:15 PM" hs="1" ks="0" cn="Chart 1" ct="p" c3="1" fmt="1" saf="0" afg="0" ptn="" lck="0" ews="Electronics Revenue vs. F . . . " oes="" ece="A1" oec="" eds="dElectronics Revenue vs. . . . " ect="0" ecl="0" ech="0" ecw="0"/>

Sample POWERPOINT Persistence XML

Grid Report

<mi app="p" ver="4" name="Sales Allocation Among Top 5 Brands by Quarter" id="4FFA8BDD44FF8EF1DC68D597D4205 DB4"

path="" ps="MicroStrategy Tutorial" srv="localhost" prj="MicroStrategy Tutorial" li="administrator" am="s" rows="8" cols="5" pa="3" ut="Apr. 30, 2004 12:55:44 PM" hs="1" ks="0" cn="" ct="p" c3="1" fmt="1" saf="0" afg="1" ptn="" lck="0" psn="269" pid="Object 25" pdid="" ppt="1" pph="152" ppw="400" ppleft="42" pptop="306" pphd="300" ppwd="300" ppleftd="0" pptopd="0" I>

Graph Report

<mi app="p" ver="4" name="Sales Allocation Among Top 5 Suppliers by Quarter" id="41A0778F46880F5E8FD891B5F7F5830B" path="" ps="MicroStrategy Tutorial" srv="localhost" prj="MicroStrategy Tutorial" li="administrator" am="s" rows="21" cols="3" pa="1" ut="Apr. 30, 2004 12:55:50 PM" hs="1" ks="0" cn="" ct="r" c3="1" fmt="1" saf="0" afg="1" ptn="" lck="0" psn="270" pid="Picture 26" pdid="" ppt="2" pph="163" ppw="400" ppleft="138" pptop="192" pphd="300" ppwd="300" ppleftd="0" pptopd="0"/>

Sample MSWORD Persistence XML

Grid Report

<mi app="w" ver="4" name="Revenue vs. Forecast" id="D08450DF4E71E2068B9AE78845C1BA28" path="Public Objects\ Reports\Revenue vs. Forecast" ps="MicroStrategy Tutorial" srv="localhost" prj="MicroStrategy Tutorial" li="Administrator" am="s" rows="15" cols="11" pa="6" ut="Apr. 30, 2004 12:29:47 PM" hs="1" ks="1" cn="" ct="x" c3="1" fmt="1" saf="0" afg="1" ptn="" lck="0" wpt="1"/>

Graph Report

<mi app="w" ver="4" name="Revenue vs. Forecast" id="D08450DF4E71E2068B9AE78845C1BA28" path="Public Objects\Reports\Revenue vs. Forecast" ps="MicroStrategy Tutorial" srv="localhost" prj="MicroStrategy Tutorial" li="Administrator" am="s" rows="49" cols="6" pa="1" ut="4/30/2004 12:30:43 PM" hs="1" ks="1" cn="" ct="1" c3="1" fmt="1" saf="0" afg="1" ptn="" lck="0" wpt="1"/>

Appendix B included with this application contains a code listing for an exemplary persistence XML schema file. In addition to the exemplary EXCEL persistence XML listed above, Appendix C also included with this application contains an example of an alternative persistence XML for a report executed in Excel containing three pages, each page containing one block.

Figure 5:
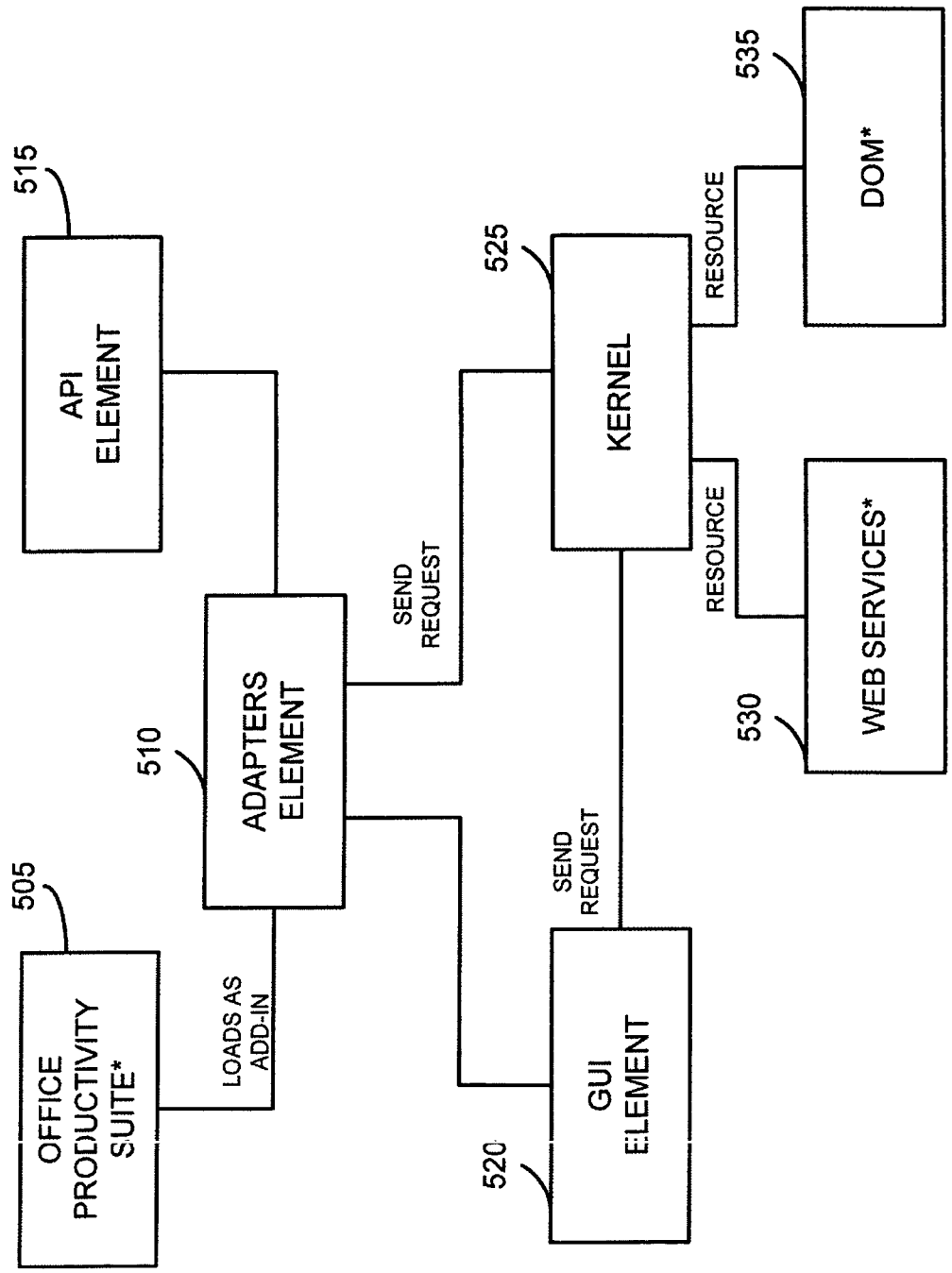
FIG. 5 is a block diagram illustrating the logical interconnection of the various layers of the multi-level interface client in accordance with one or more embodiments of the invention.

Referring now to FIG. 5, FIG. 5 is a block diagram illustrating the logical interconnection of the various layers of the multi-level interface client in accordance with embodiments of the invention. The block diagram of FIG. 5 includes a productivity suite element 505, an adapters element 510, an API element 515, a GUI element 520, a kernel element 525, a Web Services element 530 and a document object model (DOM) element 535. As discussed herein, the productivity suite may be the MICROSOFT OFFICE productivity suite or one or more clients from the OFFICE productivity suite. The asterisk next to the productivity suite 505, Web Services 530 and DOM element 535 indicate that these elements may be external elements that are not part of the interface client.

After the interface client of the present invention has been registered with the OFFICE suite, invoking the productivity suite 505 will cause the adapters element 510 to be loaded as an add-in. The adapter element represents the application-specific functionality supplied by the multi-layer interface client of the present invention. As discussed above in the context of FIG. 4, this includes functionality that differs depending upon the particular productivity client that is interacting with the interface client. For example, report display functions will be different depending upon whether the result is rendered in an EXCEL grid, a MSWORD table, a POWERPOINT slide or an ACCESS database table. The adapters layer 510 includes an application assistant class that determines which productivity suite application is interacting with the interface client and uses other classes to perform application-specific operations. The API element 515 allows custom integration with the productivity suite 505. In various exemplary embodiments, the custom integration may include macros and/or Visual Basic for Applications (VBA) programming, and/or MICROSOFT .NET language programming, and/or COM language programming. As discussed herein, the API element 515 provides an interface that allows a programmer to customize business intelligence interaction functions of the interface client to the productivity suite 505. In addition, the API element 515 is called by Smart Tag actions within applications of the productivity suite 505.

The GUI element 520 is the user's control and customization interface to the multi-layer interface client of the present invention. From the GUI, Smart Tag operations can be defined. Also from the GUI, business intelligence functions can be selected such as browse a report, execute a report, search a report, etc. The GUI is launched from a tool bar of the interface client that appears in the particular productivity suite application being used.

The kernel layer 525 receives request from the GUI and the adapters layer for business intelligence interactions. In various embodiments, these requests may include report browsing, executing, searching, and displaying. The kernel element provides the core interface client functionality such as connecting to the business intelligence server and report execution.

As discussed above, the Web Services element 530 and the document object model (DOM) element 535 are not part of the interface client itself. The Web Services element 530 represents Web Services that run on a web server associated with the business intelligence server and that provides access to business intelligence server in order to execute reports, connect to project sources, browse projects, etc. The DOM element 535 represents the model that is used to interact with XML documents, for example, report elements, Smart Tag lists, and interface client options.

Referring now to FIG. 6, FIG. 6 is a flow chart detailing the steps of a method for rendering a productivity client operable to access business intelligence information from an on-line business intelligence server in accordance with embodiments of the invention. Operation of the method begins in step S600 and proceeds to step S610 where a COM add-in for the interface client of the present invention is registered as an add-in component for the productivity suite, including all productivity suite applications supported by the interface client. Then, in step S620, the productivity suite and/or a particular productivity client is loaded which in turn causes a tool bar corresponding to the interface client to load into the particular application. Next, in step S630, a button is selected from this toolbar that invokes the GUI associated with the multi-layer interface client of the present invention. Operation of the method then proceeds to step S640 where the user defines a new Smart Tag operation. In various exemplary embodiments, this step will comprise defining a Smart Tag action associated with a Smart Tag in a file native to the particular productivity client. User defined programs will access the interface client of the present invention through the API using custom program through either Visual Basic for Applications (VBA) or macro scripting, .NET language programming, or COM language programming by going under the interface whereas the productivity client will use smart tags or the user will access the interface client through the GUI and select a business intelligence function from the GUI. This in turn will submit an action to web services.

Next, in step S650, the new Smart Tag is saved in an XML file. Operation of the method terminates in step S660. Once saved, the Smart TAg will be available to users of the corresponding productivity client, allowing the user to execute business intelligence functions from the productivity client, such as, for example, connecting to business intelligence report on a business intelligence server, executing the report so as to refresh data report data in a document in the productivity client and displaying the report in the document.

FIG. 7 is a flow chart detailing the steps of a method for updating information in a productivity client file from a network-based business intelligence system directly in the productivity client in with various embodiments of the invention. Operation of the method begins in step S700 and proceeds to step S710 where the user opens a productivity client file. In various exemplary embodiments, the file will be a previously created file containing a displayed business intelligence report obtained through functionality provided by the multi-layer interface client of the present invention.

Next, in step S720, the productivity client recognizes a Smart Tag associated with a Smart Tag action in the document. Detection of the Smart Tag causes a pop-up dialog box to appear in the document containing action choices associated with the Smart Tag. Then, in step S730, the user selects an action from the pop-up dialog box. Selecting the action in step S730 leads to step S740 wherein the API layer of the multi-layer interface client is invoked. This leads to step S750 where a business intelligence report request is sent through the kernel layer to the network-based business intelligence server through Web Services. Alternatively, the user may select a business intelligence function directly from the GUI. In either case, that it through smart tags, or through the GUI, once the kernel layer is invoked, the back end processing is substantially the same.

Operation of the method from this point is performed remotely by the web server and business intelligence server. In step S760, after processing by the web server associated with the business intelligence server, the particular business intelligence report request is performed by the business intelligence server. Then, in step S770, the business intelligence server, in conjunction with a web server, sends the results rated as a result of the report request back to the interface client where, in step S780, layout and formatting are performed so that they can be displayed in the productivity client. Operation of the method terminates in step S790.

As discussed and illustrated herein, the multi-layer interface client according to embodiments of this invention permits users to access the functionality of a business intelligence server computer system over a computer network through applications which are familiar and also typically used to display report results generated on the business intelligence system. By working as a add-in to the OFFICE productivity suite impact on the interface client is minimized and the user is not required to learn multiple proprietary interfaces. These and other advantages associated with embodiments of the present invention will be readily apparent to those of ordinary skill in the art.

It will be apparent to those skilled in the art that various modifications and variations can be made in the apparatuses and methods of the present invention without departing from the scope or spirit of the invention. Thus, it is intended that the present invention cover the modifications and variations of this invention provided they come within the scope of the appended claims and their equivalents.

The invention claimed is:

1. A network-based system for accessing and updating information from an on-line business intelligence system through a productivity client comprising:
a multi-level interface client providing access to report files in the business intelligence system to at least one productivity client, the multi-level interface client comprising a graphical user interface (GUI) layer, an application program interface (API) layer, a productivity client adapter layer and a kernel layer, wherein each time a report is executed by the business intelligence system for the at least one productivity client, persistence information is stored by the multi-level interface client in a file of the productivity client containing the report.

2. The system according to claim 1, the multi-level interface client further comprising a component object model (COM) add-in for integrating the multi-level interface client to the at least one productivity client.

3. The system according to claim 2, wherein the COM add-in is configured to generate a tool bar for the multi-level interface client in the at least one productivity client.

4. The system according to claim 3, wherein the tool bar comprises at least one button operable to invoke the GUI layer.

5. The system according to claim 1, further comprising a transmission facility for transmission of a request relating to a business intelligence report to the business intelligence system and transmission of a reply based on the request over a communications network.

6. The system according to claim 5, wherein the communications network is the Internet.

7. The system according to claim 5, wherein the multi-level interface client utilizes Web Services protocol for communication with the business intelligence system.

8. The system according to claim 1, wherein functionality available through the API layer is accessible through macro, Visual Basic for Applications (VBA) programming, MICROSOFT .NET language programming, and COM language programming.

9. The system according to claim 1, wherein the productivity client adapter layer comprises a set of business intelligence functional operations available to the at least one productivity client, wherein the operations comprise a mixture of operations common to more than one productivity client and operations specific to a particular productivity client.

10. The system according to claim 1, further comprising a Smart Tag XML file storing a combination of report Smart Tags and project Smart Tags.

11. The system according to claim 1, the kernel layer is operable to modify the Smart Tag XML file.

12. The system according to claim 1, the persistence information comprising information about the report itself, the network connection used to execute the report, display properties, and layout information specific to the productivity client in which the report is displayed.

13. The system according to claim 1, wherein the persistence information is stored as a persistence XML element.

14. The system according to claim 13, the persistence XML element comprising a single element tag having multiple attributes comprising at least a set of common attributes and a set of productivity client-specific attributes.

15. The system according to claim 13, wherein the persistence information is used by the kernel layer to enable native refreshing of data in the report from the business intelligence system directly in the productivity client without loss of productivity client-specific layout and display attributes.

16. The system according to claim 1, wherein the productivity client is a client selected from the group consisting of a word processing client, a database client, a spreadsheet client, an email client and a presentation client.

17. The system according to claim 1, wherein the on-line business intelligence system is an on-line analytical processing (OLAP) system.

18. A multi-level business intelligence system interface client for use with at least one productivity client comprising:
   a GUI layer;
   an API layer;
   a productivity client adapter layer; and
   a kernel layer,
   wherein each time a report is executed by the business intelligence system for the at least one productivity client, persistence information is stored by the multi-level interface client in a file of the productivity client containing the report.

19. The multi-level interface client according to claim 18, further comprising a COM add-in for integrating the multi-level interface client to the at least one productivity client.

20. The multi-level interface client according to claim 19, wherein the COM add-in is configured to generate a tool bar for the multi-level interface client in the at least one productivity client.

21. The multi-level interface client according to claim 20, wherein the tool bar comprises at least one button operable to invoke the GUI layer.

22. The multi-level interface client according to claim 18, further comprising a transmission facility for transmission of a request relating to a business intelligence report to the business intelligence system and transmission of a reply based on the request over a communications network.

23. The multi-level interface client according to claim 22, wherein the communications network is the Internet.

24. The multi-level interface client according to claim 22, wherein Web Services protocol is utilized by the interface client for communication with the business intelligence system.

25. The multi-level interface client according to claim 18, wherein functionality available through the API layer is accessed through macro, VBA programming, MICROSOFT-.NET language programming, and COM language programming.

26. The multi-level interface client according to claim 18, the productivity client adapter layer comprising a set of business intelligence functional operations available to the at least one productivity client, wherein the operations comprise a set of common operations and a set of operations specific to a particular productivity client.

27. The multi-level interface client according to claim 18, further comprising a Smart Tag XML file, storing a combination of report Smart Tags and project Smart Tags.

28. The multi-level interface client according to claim 18, wherein the kernel layer is operable to modify the Smart Tag XML file.

29. The multi-level interface client according to claim 18, the persistence information comprising information about the report itself, the network connection used to execute the report, display properties, and layout information specific to the productivity client in which the report is displayed.

30. The multi-level interface client according to claim 18, wherein the persistence information is stored as a persistence XML element.

31. The multi-level interface client according to claim 30, the persistence XML element comprising a single element tag having multiple attributes comprising at least a common set of attributes and productivity client specific attributes.

32. The multi-level interface client according to claim 30, wherein the persistence information is used by the kernel layer to enable native refreshing of data in the report from the business intelligence system directly in the productivity client.

33. The interface client according to claim 18, wherein the productivity client is a client selected from the group consisting of a word processing client, a database client, a spreadsheet client, and a presentation client.

34. The interface client according to claim 18, wherein the business intelligence system is an OLAP system.

35. A method for rendering a productivity client operable to access business intelligence information from an on-line business intelligence server comprising:
   registering a COM add-in for the productivity client;
   invoking the productivity client;
   selecting, from a tool bar associated with the COM add-in, a tool bar button operable to invoke a GUI of a multi-layer interface client;
   using the GUI, defining an operation relating to a business intelligence report generated by a business intelligence server, wherein when invoked, the operation calls an API layer of the multi-layer interface client which in turn causes a kernel layer of the multi-layer interface client to access the on-line business intelligence server over a communication network and perform the operation.

36. The method according to claim 35, wherein the step of defining an operation comprises defining an operation selected from the group consisting of browsing a business intelligence report, searching a business intelligence report, executing a business intelligence report, displaying a business intelligence report and mixtures thereof.

37. The method according to claim 36, wherein the step of defining an operation comprises defining a Smart Tag operation associated with a Smart Tag in a productivity client file.

38. The method according to claim 36, wherein the step of defining an operation comprises defining an operation associated with either a VBA code, macro script, .NET language programming, or COM language programming.

39. The method according to claim 36, wherein the step of accessing the on-line business intelligence server comprises sending a message, using the Web Service protocol, to a web server associated with the business intelligence server, the message conveying instructions associated with the operation.

40. A method for rendering a productivity client operable to access business intelligence information from an on-line business intelligence server comprising:
   registering a COM add-in for the productivity client;
   invoking the productivity client;
   selecting, from a tool bar associated with the COM add-in, a tool bar button operable to invoke a GUI of a multi-layer interface client;
   using the GUI, defining an operation relating to a business intelligence report generated by a business intelligence server, wherein when invoked, the operation calls an API layer of the multi-layer interface client which in turn causes a kernel layer of the multi-layer interface client to access the on-line business intelligence server over a communication network and perform the operation; and
   after a report has been executed by the business intelligence server, storing persistence information related to the report including information about the report itself, connection information describing the connection used to execute the report, display properties of the report and layout information including properties relating to the specific productivity client in which the report is displayed such that the persistence information will be preserved during subsequent executions of the report.

41. A method for updating information in a productivity client file from a network-based business intelligence system directly in the productivity client comprising:

opening a productivity client file in the productivity client, the productivity client file containing data from an business intelligence reporting system;

detecting with the productivity client, a Smart Tag action in the productivity client file;

executing the Smart Tag action by selecting a command in a pop-up dialog box associated with the Smart Tag;

invoking an API layer of a multi-layer interface client upon execution of the Smart Tag action;

using a kernel layer of the multi-layer interface client, sending a business intelligence report execute and update request to the network-based business intelligence system;

executing the report at the business intelligence system;

receiving the executed report results at the kernel layer of the multi-layer interface client;

formatting the layout of the results based on stored persistence attributes; and displaying the re-run report in the productivity client based on the stored persistence attributes.

\* \* \* \* \*